United States Patent [19]
Veigl

[11] Patent Number: 5,161,078
[45] Date of Patent: Nov. 3, 1992

[54] MAGNETIC TAPE SYSTEM INCLUDING A ROTATABLE HEAD SUPPORT FOR ROTATING THE MAGNETIC HEAD OF THE SYSTEM THROUGH SUBSTANTIALLY 180°

[75] Inventor: Johann Veigl, Vienna, Austria

[73] Assignee: U.S. Philips Corporation, New York, N.Y.

[21] Appl. No.: 534,212

[22] Filed: Jun. 6, 1990

[30] Foreign Application Priority Data

Jun. 6, 1989 [AT] Austria .................. 1384/89

[51] Int. Cl.⁵ .................................. G11B 5/55
[52] U.S. Cl. .................................. 360/106
[58] Field of Search .................................. 360/106

[56] References Cited

U.S. PATENT DOCUMENTS

| | | | |
|---|---|---|---|
| 4,510,543 | 4/1985 | Ohta | 360/106 |
| 4,542,430 | 9/1985 | Tomita | 360/106 |
| 4,899,239 | 2/1990 | Kido | 360/106 |
| 5,003,421 | 3/1991 | Kido | 360/106 |

FOREIGN PATENT DOCUMENTS 61-22413 1/1986 Japan .

Primary Examiner—A. J. Heinz

[57] ABSTRACT

A magnetic tape apparatus (1) with a reversible magnetic head (28) has a rotatable head support (36), which can be turned between two operating positions and is rotatably mounted with play in a bearing opening (46) of a bearing device (45). The bearing device (45) is provided in the region of the bearing opening (46) with clearances (58, 59, 60, 61, 62) for the head support (36) and, in both its operating positions, the head support (36) is pressed exclusively against two predetermined bearing locations (96, 97 and 96, 98, respectively) in the bearing opening (46), these bearing locations (96, 97, 98) being of a punctiform design, seen in cross-section of the bearing opening (46).

2 Claims, 3 Drawing Sheets

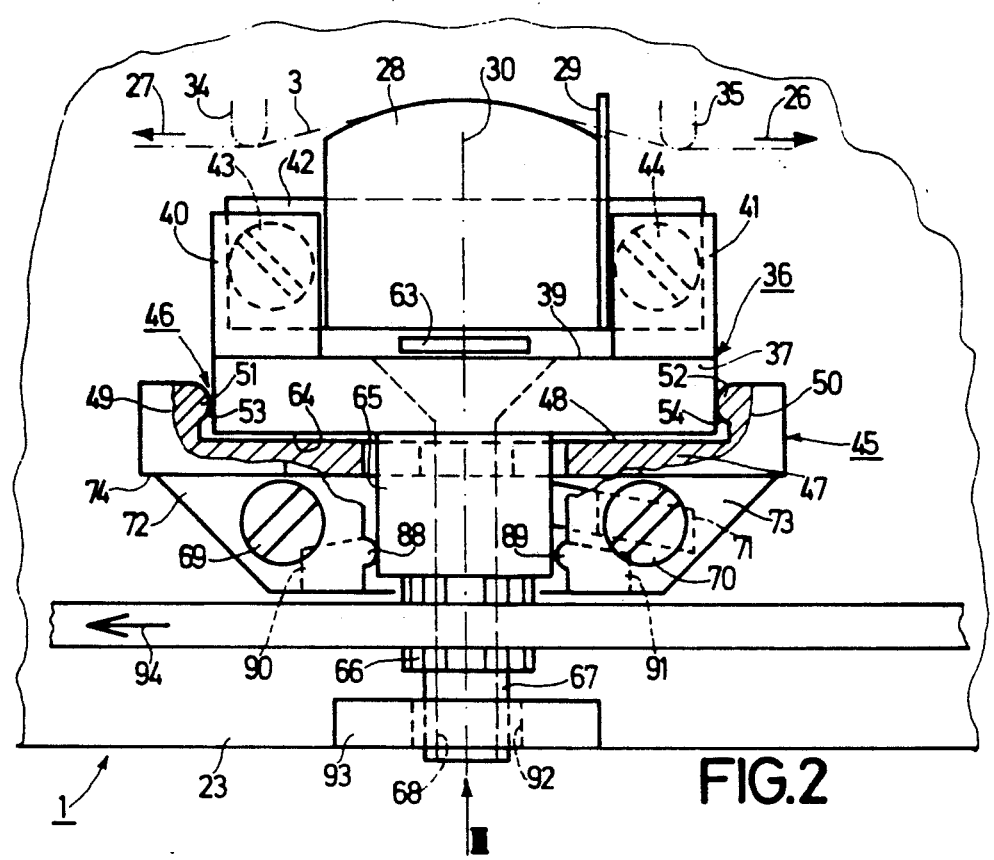
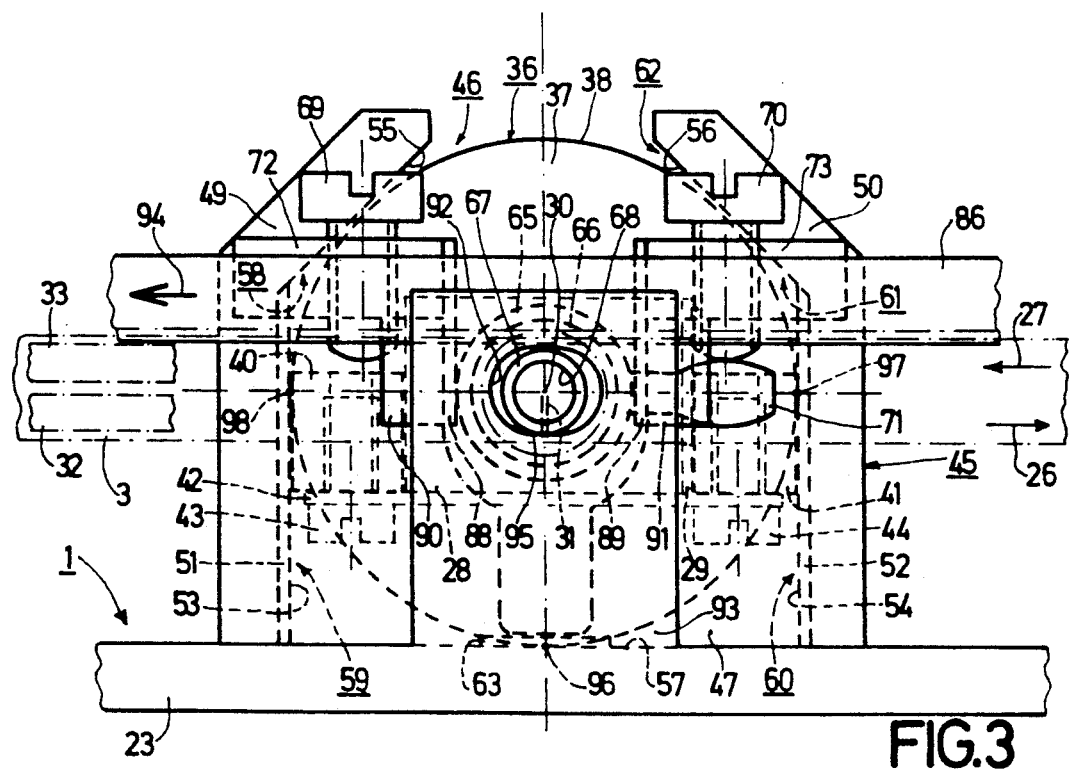

MAGNETIC TAPE SYSTEM INCLUDING A ROTATABLE HEAD SUPPORT FOR ROTATING THE MAGNETIC HEAD OF THE SYSTEM THROUGH SUBSTANTIALLY 180°

BACKGROUND OF THE INVENTION

1. Field of the Invention

The invention relates to a magnetic tape apparatus with a magnetic head, which can be turned essentially through 180° between two scanning positions, which are each assigned to one of two opposite tape-running directions and in which the magnetic head each time scans at least one track of a magnetic tape, with a rotatable head support supporting the magnetic head, with a bearing device with a bearing opening, in which the head support is rotatably mounted with play, with an adjusting device for the head support, with which device the head support can be rotated between two operating positions for turning the magnetic head between its two scanning positions, with positioning devices on the head support and in the apparatus, with which devices the head support is positioned in its two operating positions, and with at least one load-exerting device, which presses the head support in both of its operating positions with a bearing surface of the same in the bearing opening against the bearing device and which presses the positioning devices on the head support and in the apparatus against one another.

2. Description of the Related Art

In the case of a commercially available known apparatus of the generic type referred to above, the bearing opening in the bearing device is of a hollow-cylindrical design and completely encloses a cylindrically designed bearing surface of the head support. Due to the hollow-cylindrical design of the bearing opening and to the play existing between the hollow-cylindrical bearing opening and the cylindrical bearing surface of the head support, at the end of the rotating of the head support into its respective operating position, the bearing surface does not always find the same contact position in the hollow-cylindrical bearing opening, so that the head support cannot always be brought into the same respective operating position in a definitely reproducible way. This has the consequence, however, that the magnetic head supported by the head support cannot always be brought into the same respective scanning position in a definitely reproducible way, which is disadvantageous with regard to always constantly good scanning conditions by the magnetic head.

SUMMARY OF THE INVENTION

It is the object of the invention to avoid the difficulties mentioned above and to design an apparatus of the generic type specified at the beginning in such a way that the magnetic head can always be brought into the same respective scanning position in a definitely reproducible way.

For this purpose, the invention is characterized in that the bearing device is provided in the region of the bearing opening with clearances for the head support and in that, in the two operating positions of the head support, the same is pressed with its bearing surface exclusively against two predetermined bearing locations in the bearing opening, the head support and the bearing device resting against each other at the bearing locations essentially in a punctiform manner, seen in cross-section of the bearing opening.

In this way it is achieved that, at the end of the rotating of the head support into its respective operating position, the bearing surface of the head support always rests essentially in a punctiform manner, seen in cross-section of the bearing opening, at the same two predetermined bearing locations in the bearing opening of the bearing device. The head support can consequently always be brought into the same respective operating position, defined by the two bearing locations, in a definitely reproducible way and held in the said position by the load-exerting device. It is hereby achieved in an advantageous way that the magnetic head supported by the head support can always be brought into the same respective scanning position in a definitely reproducible way and is held in the said position, so that always constantly good scanning conditions by the magnetic head are ensured.

The predetermined bearing locations may be formed by spherical or partially cylindrical elevations, which protrude from the bearing device into its bearing opening. However, such bearing locations are relatively difficult to produce and are subject to relatively great wear. It has therefore proved advantageous if the bearing opening is at least partially bounded by straight-running bounding walls, which form a tangent to the head support with play and on which the predetermined bearing locations are provided. This is advantageous with regard to low wear and simplest possible design of the predetermined bearing locations.

In this context, it has proved particularly advantageous if the bearing opening has two bounding walls running perpendicularly to the two tape-running directions and one bounding wall running parallel to the two tape-running directions, on which three bounding walls the predetermined bearing locations are provided. This is advantageous with regard to easiest possible production of the bearing opening, in particular by plastics technology, because easy demouldability is hereby ensured.

The frictional forces exerted by the magnetic tape on the magnetic head may counteract the pressing, brought about by the load-exerting device, of the head support with its bearing surface against the bearing locations concerned in the bearing opening of the bearing device, the risk then existing that, if such frictional forces are very high, the head support may be lifted off the bearing locations concerned, which has as a consequence an adjustment of the magnetic head out of its respective scanning position. Therefore, it has proved advantageous if, in both operating positions of the head support, the frictional force exerted by the magnetic tape on the magnetic head assists the pressing, brought about by the load-exerting device, of the head support against at least one of the bearing locations in the bearing opening. In this way it is achieved that the magnetic head always remains in its respective scanning position even with very high frictional forces acting on the magnetic head.

BRIEF DESCRIPTION OF THE DRAWINGS

The invention is described in further detail below with reference to a number of exemplary embodiments, to which the invention is not to be restricted however.

FIG. 2 shows in plan view, on a larger scale than in FIG. 1, a detail of the apparatus according to FIG. 1 with the reversible magnetic head, which is supported by a rotatable head support, which is rotatably mounted with play in a bearing opening of a bearing device.

FIG. 3 shows the detail according to FIG. 2 in a side view according to the arrow III in FIG. 2.

DETAILED DESCRIPTION OF THE PREFERRED EMBODIMENTS

Figure 1:
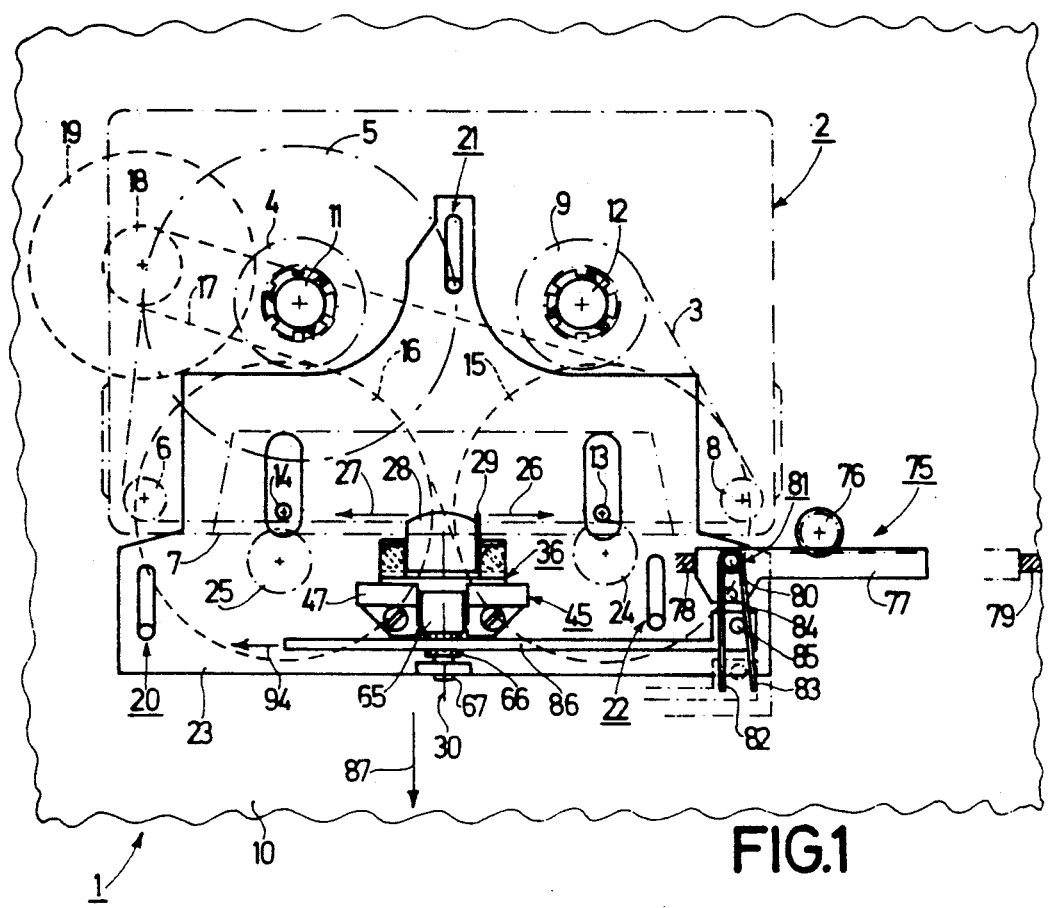
FIG. 1 diagrammatically shows in plan view a part of a magnetic tape apparatus essential for the invention, according to a first exemplary embodiment of the invention, with which part a magnetic tape which can be driven in opposite tape-running directions can be scanned and which has for scanning the magnetic tape a magnetic head, which can be turned through 180° between two scanning positions, for recording and playback.

FIG. 1 shows a part of a magnetic tape apparatus 1, into which a cassette 2, diagrammatically represented in FIG. 1 by dot-dashed lines, can be loaded. For this purpose, the apparatus 1 has, for example, a tray-shaped cassette compartment (not shown). A magnetic tape 3 is accommodated in the cassette 2. The magnetic tape 3 is led from a first hub 4, onto which, in the state shown, the magnetic tape 3 is wound into a tape roll 5, via a tape guide 6 and along a long narrow side 7 of the cassette and via a further tape guide 8 to a second hub 9.

The magnetic tape apparatus 1 has an essentially plate-shaped chassis 10. A first rotatingly drivable winding spindle 11, for the rotating driving of the first hub 4, and a second rotatingly drivable winding spindle 12, for the rotating driving of the second hub 9, are rotatably mounted on the chassis 10. A first capstan 13 and a second capstan 14 are also rotatably mounted on the chassis 10. Each of the two capstans 13 and 14 is connected in a rotationally fixed manner to a flywheel 15 and 16, respectively. A belt 17, which is led via a pulley 18, is wrapped around part of the circumferential surfaces of the two flywheels 15 and 16 in opposite winding directions. The pulley 18 can be driven at constant speed anticlockwise, according to FIG. 1, by a motor 19 fastened on the chassis 10. The second winding spindle 12 can be driven by the first capstan 11 and the first winding spindle 13 can be driven by the second capstan 14, this in a known way in each case by means of an intermediate gear mechanism, which can be selectively activated and consists for example of a plurality of gearwheels and has a slip clutch to compensate for differences in speed.

Furthermore, the apparatus 1 has on the chassis 10 a support plate 23, guided displaceably by three pin-slot connections 20, 21 and 22 perpendicularly to the long narrow side 7 of the cassette. A first pinch roller 24 and a second pinch roller 25, each indicated by dot-dashed lines and pivotally mounted on the support plate 23 by means of bearing levers (not shown), are provided on the support plate 23, one of which rollers, according to choice, can in each case be brought into resilient contact with one of the two capstans 13 and 14, the magnetic tape 3 being located between the capstan concerned and the pinch roller concerned. In this way, the magnetic tape 3 can be driven at constant tape speed by means of a rotatingly driven capstan, against which the magnetic tape is pressed by the associated pinch roller. In a "normal forward running" operating mode, the first pinch roller 24 is pressed against the first capstan 13, as is shown in FIG. 1. In this case, the first capstan 13 is driven at constant speed anticlockwise, according to FIG. 1, by the motor 19, so that consequently the magnetic tape 3 is driven in the tape-running direction denoted by an arrow 26. The magnetic tape 3 is hereby wound onto the second hub 9, driven by the second winding spindle 12. In a "normal rewind" operating mode, also known as "reverse running", the second pinch roller 25 is pressed against the second capstan 14, the second capstan 14 being driven clockwise, according to FIG. 1, by the motor 19, so that consequently the magnetic tape 3 is driven in the tape-running direction denoted by an arrow 27. Then, the magnetic tape 3 is hereby wound onto the first hub 4, driven by the first winding spindle 11.

A magnetic head 28, which is designed for recording and reproducing information signals, for example sound signals, is also attached on the support plate 23 of the magnetic tape apparatus 1 and a fork-shaped tape guide 29 is connected to its housing. The magnetic head 28 can be turned about a turning axis 30, running perpendicularly to the long narrow side 7 of the cassette, through 180° between two scanning positions, one of which is represented in FIGS. 1 to 3. Each scanning position is assigned to one of the two opposite tape-running directions 26 and 27. In each scanning position, the magnetic head 28 scans with a working clearance 31, which is diagrammatically indicated in FIG. 3 and lies eccentrically with respect to the turning axis 30 of the magnetic head 28, a track region of the magnetic tape 3. In FIG. 3, the two track regions of the magnetic tape 3 are denoted by the reference numerals 32 and 33. According to FIGS. 2 and 3, the magnetic tape 3 is driven in the tape-running direction 26 and, accordingly, the magnetic head 28 assumes that scanning position in which it scans the track region 32 with its magnetic clearance 31. If the magnetic tape 3 is driven in the opposite tape-running direction 27, the magnetic head 28 assumes the reversed other scanning position, in which it then scans the other track region 33 with its magnetic clearance 31. It should be mentioned that, in the case of a monophonic recording or reproduction, the magnetic head 28 scans for each track region 32 or 33 in actual fact only a single track, but that in the case of a stereophonic recording or reproduction the magnetic head 28 scans for each track region 32 and 33 two adjacent tracks in the track region concerned, with two separate working clearances. In FIG. 2, two tape guides 34 and 35 on the cassette are indicated by dot-dashed lines, which guides ensure the necessary wrapping around the magnetic head 28 by the magnetic tape 3.

The magnetic head 28 is supported by a head support 36, which can be rotated about the turning axis 30. The head support 36 has a cylindrical support disc 37, which has an outer cylindrical bearing surface 38. Two block-shaped extensions 40 and 41 project in the direction of the turning axis 30 from one side surface 39 of the support disc 37. A plate 42 is fastened with the aid of two screws 43 and 44 to these two extensions 40 and 41. The magnetic head 28 is fastened to the plate 42, for example by welding. In this way, the magnetic head 28 is connected to the support disc 37 of the head support 36.

The magnetic tape apparatus 1 has on the support plate 23 a bearing device 45 with a bearing opening 46 for the rotatable bearing of the head support 36. The bearing device 45 in this case consists partly of the support plate 23 itself and of an essentially disc-shaped bearing part 47, connected to the support plate 23. The bearing part 47 is provided in the region of its side surface 48 facing the magnetic head 28 with two bearing strips 49 and 50, which are arranged mirror-symmetrically to each other and are angled off towards each other in their region facing away from the support plate 23. In their region running perpendicularly to the support plate 23, the two bearing strips 49 and 50 each have a straight-running, cross-sectionally approximately semi-circularly rounded bearing rib 51 and 52, respectively, the semicircular bounding walls 53 and 54 of which each form a bounding wall, running perpendicularly to both the tape-running directions 26 and 27, of the bearing opening 46, in which the support disc 37 is rotatably mounted. Two further bounding walls 55 and 56 of the bearing opening 46 are provided on the regions of the bearing strips 49 and 50 angled off towards each other. A further bounding wall 57 of the bearing opening 46 is formed by a part of the wall, facing the magnetic head 28, of the support plate 23. This bounding wall 57 of the bearing opening 46 runs in the direction of the two tape-running directions 26 and 27. The head support 36, with its support disc 37, is rotatably mounted with play in the bearing opening 46 bounded by the previously mentioned bounding walls 53, 54, 55, 56 and 57. In practice, this play is approximately one tenth of a millimeter. As is evident from FIG. 3, the bearing device 45 is provided in the region of the bearing opening 46 with clearances 58, 59, 60, 61 and 62 for the head support 36, to be precise for its support disc 37, so that the head support 36 rests with its support disc 37 in a punctiform manner, seen in cross-section of the bearing opening, only against predetermined bearing locations in the bearing opening 46, which will be discussed in more detail below. To limit the axial mobility of the head support 36, a strip 63, protruding from the support plate 23, interacts with the support disc 37 of the said head support.

The head support 36 has on the side surface 64, facing away from the magnetic head 28, of the support disc 37 a cylindrical first positioning cylinder 65, which is coaxial to the said disc. Connected to this first positioning cylinder 65 is a gearwheel 66, coaxial to the latter. Connected to the gearwheel 66 is a second positioning cylinder 67, coaxial to the latter and of smaller diameter. A bore 68 leads through the support disc 37, the first positioning cylinder 65, the gearwheel 66 and the second positioning cylinder 67 and widens conically in the support disc 37 towards the magnetic head 28. Connecting leads (not shown) to the magnetic head 28 are led through the bore 68.

As mentioned, the magnetic head 28 can be turned through 180° between two scanning positions. Accordingly, the head support 36 can likewise be rotated through 180° between two operating positions. These two operating positions are fixed with the aid of two adjustable positioning screws 69 and 70, which are provided in the apparatus and against the free ends of which there is supported, depending upon the operating position of the head support 36, a positioning extension 71, protruding from the first positioning cylinder 65 in the radial direction, as is represented in FIGS. 2 and 3 for that operating position of the head support 36 which corresponds to the "normal forward running" operating mode. The positioning screws 69 and 70 are each screwed into a plate-shaped extension 72 and 73, respectively, of the bearing part 47. The two extensions 72 and 73 protrude in the direction of the turning axis 30 from the bearing part 47 on its side face 74 facing away from the magnetic head 28.

For turning the magnetic head 28 and the head support 36, the apparatus 1 has an adjusting device 75 for the head support 36, which is shown in FIG. 1. The adjusting device 75 has a gearwheel 76, which can be driven by motor, in a way not shown, in opposite directions of rotation. The gearwheel 76 meshes with a toothed rack 77, which is guided displaceably in its longitudinal direction on the chassis 10 and can be displaced back and forth between two diagrammatically indicated limiting stops 78 and 79. A leg spring 81, between the two legs 82 and 83 of which there projects a pin 84 protruding from the toothed rack 77, whereby the leg spring 81 is positioned, is fitted onto a pivot 80 protruding from the toothed rack 77. The two legs 82 and 83 of the leg spring 81 have the tendency to move towards each other. There also protrudes between the two legs 82 and 83 of the leg spring 81 a further pin 85, which is connected to a toothed rack 86, guided displaceably in its longitudinal direction on the support plate 23. The toothed rack 86 is in engagement with the gearwheel 66 of the head support 36.

In a known way, the turning of the magnetic head 28 is only possible if the magnetic head 28 is adjusted so far out of the scanning position represented in FIG. 1 in the direction of the arrow 87 that it is drawn out of the cassette 2. This adjustment of the magnetic head 28 is achieved by adjusting the support plate 23 in the direction of the arrow 87, as is indicated for a part of the support plate 23 and the end of the toothed rack 86 bearing the pin 85 by dot-dashed lines in FIG. 1. As is evident from this dot-dashed representation, even when the support plate 23 is adjusted, the pin 85 lies between the two legs 82 and 83 of the leg spring 81, so that a transmission of force from the motor-driven gearwheel 76 and the toothed rack 77 via the leg spring 81 onto the pin 85, and consequently the toothed rack 86, the gearwheel 66 and the head support 36, is ensured when the support plate 23 is adjusted. Therefore, before turning of the magnetic head 28 the support plate 23 is adjusted in the direction of the arrow 87 and, once the magnetic head 28 has been turned, the support plate 23 is adjusted back counter to the direction of the arrow 87. It is not significant for the present invention how this adjustment of the support plate 23 takes place, and it is therefore not shown.

For additional positioning of the head support 36 in its two operating positions, it is connected to the first coaxial positioning cylinder 65 and the second coaxial positioning cylinder 67. To interact with the first positioning cylinder 65, two positioning ribs 88 and 89 are provided, which run perpendicularly to the two tape-running directions 26 and 27 and are approximately semicircular in cross-section. The positioning ribs 88 and 89 are provided on two blocks 90 and 91, protruding in the direction of the support plate 23 from the plate-shaped extensions 72 and 73 of the bearing part 47. The second coaxial positioning cylinder 67 projects through a slot-shaped opening 92, which is provided in a positioning plate 93, protruding perpendicularly from the support plate 23.

The turning of the magnetic head 28 is described below. It is assumed that the magnetic head 28 assumes that scanning position which is not represented in FIGS. 1 to 3 and in which its magnetic clearance 31 scans the track region 33, the toothed rack 77 then being located in the position indicated by a dot-dashed line in FIG. 1, in which position it is supported against the limiting stop 79. First of all, the support plate 23 is displaced in the direction of the arrow 87, so that the magnetic head 28 is drawn out of the cassette 2. Thereafter, the gearwheel 76 is driven clockwise, according to FIG. 1, as a result of which the toothed rack 77 is displaced into its position represented by solid lines in FIG. 1, in which position it is supported against the limiting stop 78. In this case, the pin 85 is adjusted by means of the leg spring 81, to be precise by means of its leg 83, under tension of the leg spring 81, so that the toothed rack 86 is displaced in the direction of the arrow 94. As a result, the gearwheel 66 is rotated anticlockwise, according to FIG. 3. In this way, the head support 36 is also rotated anticlockwise, to be precise until the positioning extension 71 is supported against the free end of the positioning screw 70. When this is the case, the head support 36 has reached its operating position, in which the magnetic head 28 then assumes that scanning position in which it can scan the track region 32 with its magnetic clearance 31. Thereafter, the support plate 23 is adjusted back counter to the direction of the arrow 87, the magnetic head 28 then again entering the cassette 2 and going into scanning connection with the magnetic tape 3. This operating situation is represented in FIGS. 1 to 3.

In the operating situation represented in FIGS. 1 to 3, the leg spring 81, supported against the toothed rack 77, always exerts with its leg 83, via the pin 85, on the toothed rack 86 a force which loads the toothed rack 86 in the direction of the arrow 94. The leg spring 81 consequently forms a load-exerting device which always loads the toothed rack 86 in the direction of the arrow 94 when the head support 36 is in the present operating position. By this loading with the leg spring 81, a force is always exerted by the toothed rack 86 on the gearwheel 66. This force has the effect of pressing the positioning extension 71 against the free end of the positioning screw 70. This force also has the effect of pressing the first positioning cylinder 65 against the positioning rib 88. This force also has the effect of pressing the second positioning cylinder 67 against the bounding wall 95, facing the support plate 23, of the opening 92 in the positioning plate 93. The pressing of the positioning extension 71 against the free end of the positioning screw 70, brought about by the toothed rack 86 has the effect of producing a torque, which acts on the head support 36 and by which the support disc 37 of the head support 36 is pressed with its bearing surface 38 against the bounding wall 57, formed on the support plate 23, of the bearing opening 46, the support disc 37 of the head support 36 and the bounding wall 57 of the bearing opening 46 of the bearing device 45 resting against each other at a bearing location 96, which is punctiform in shape, seen in cross-section of the bearing opening 46. The pressing of the first positioning cylinder 65 against the positioning rib 88, brought about by the toothed rack 86, has the effect of producing a further torque, which acts on the head support 36 and by which the support disc 37 of the head support 36 is pressed with its bearing surface 38 against the bounding wall 54 of the bearing rib 52, the support disc 37 of the head support 36 and the bounding wall 54 of the bearing rib 52 resting against each other at a bearing location 97, which is likewise punctiform in shape, seen in cross-section of the bearing opening 46.

In the way described above, the head support 36 is positioned exactly in its operating position. In this operating position, the head support 36 is pressed with the bearing surface 38 of its support disc 37 exclusively against the two predetermined bearing locations 96 and 97. Since the head support 36 rests against the two predetermined, cross-sectionally punctiform bearing locations 96 and 97 every time it is rotated into this operating position, it is ensured that the head support 36 is always brought into the same operating position, fixed by the two predetermined bearing locations 96 and 97, in a definitely reproducible way. It is thereby achieved that the magnetic head 28 supported by the head support 36 is brought into always the same scanning position in a definitely reproducible way, so that always constantly good scanning conditions by the magnetic head 28 are ensured.

As is evident from FIGS. 2 and 3, in the operating position shown of the head support 36, the magnetic tape 3 runs in the tape-running direction 26 over the magnetic head 28. In so doing, the magnetic tape 3 exerts a frictional force on the magnetic head 28. This frictional force runs in the tape-running direction 26 and has, via the magnetic head 28, the consequence of a torque which acts on the head support 36 and assists the pressing, brought about by the leg spring 81, of the head support 36 with its support disc 37 against the bearing location 97 in the bearing opening 46. It is thereby ensured that the magnetic head 28 always remains securely in its scanning position even if there is a high frictional force acting on the magnetic head 28.

In the operating position of the head support 36 which is not represented and is turned with respect to the operating position described above and represented in FIGS. 1 to 3, the leg spring 81 provided as the load-exerting device always exerts a force counter to the direction of the arrow 94 on the toothed rack 86. As a result, a force by which the positioning extension 71 is pressed against the free end of the other positioning screw 69, the first positioning cylinder 65 is pressed against the other positioning rib 89 and the second positioning cylinder 67 is again pressed against the bounding wall 95 of the opening 92 in the positioning plate 93 is always exerted by the toothed rack 86 on the gearwheel 66 of the head support 36. Furthermore, in this case the support disc 37 of the head support 36 is pressed against the bounding wall 57 of the bearing opening 46 and against the bounding wall 53 of the other bearing rib 51 in the bearing opening 46, the support disc 37 of the head support 36 then again resting exclusively against two predetermined, cross-sectionally punctiform bearing locations on the bearing device 45, namely against the bearing location 96 and against a further bearing location 98 on the bounding wall 53 of the bearing rib 51, so that the advantages described above are achieved in this operating position of the head support 36 as well.

Figure 4:
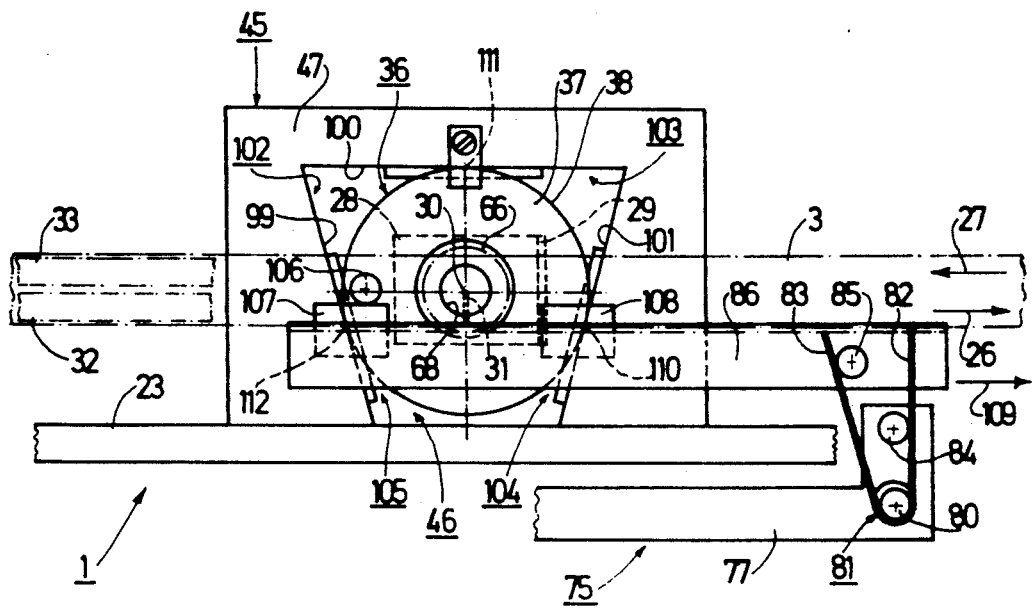
FIG. 4 shows analogously to FIG. 3 a detail of a magnetic tape apparatus according to a second exemplary embodiment of the invention.

In the case of the exemplary embodiment diagrammatically represented in FIG. 4, the head support 36 for the magnetic head 28 consists of a cylindrical support disc 37, which is connected to a coaxial gearwheel 66 for rotating the head support 36. The magnetic head 28 is in this case fitted in a clamping and play-free manner into a recess in the support disc 37, partially accommodating its side surfaces. The bearing device 45 is formed by a block-shaped bearing part 47, which is connected to the support plate 23 and has a bearing opening 46, which is bounded by three plane bounding walls 99, 100 and 101 and in which the head support 36 is rotatably mounted with play with its support disc 37. In the case of this apparatus as well, the bearing device 45 is provided in the region of the bearing opening 46 with clearances 102, 103, 104 and 105 for the head support 36. The adjusting device 75 has an analogous construction to the adjusting device of the apparatus according to FIGS. 1 to 3, a leg spring 81 likewise being provided as load-exerting device. For positioning the head support 36 in its two operating positions, a positioning pin 106 protrudes from the support disc 37 in the direction of the turning axis 30 and interacts in each of the two operating positions with a positioning block 107 and 108, respectively, protruding from the bearing part 47.

In the operating situation represented in FIG. 4, in which the magnetic tape 3 is moved along the magnetic head 28 in the tape-running direction 26, corresponding to the "normal forward running" operating mode, and the head support 36 assumes an operating position corresponding to this operating mode, the leg spring 81 provided as load-exerting device exerts with its leg 83, via the pin 85, on the toothed rack 86 a force which attempts to displace the toothed rack 86 in the direction of the arrow 109. In this way, a force by which the support disc 37 is pressed with its circumferential bearing surface 38 against the bounding walls 101 and 100 of the bearing opening 46, to be precise at two cross-sectionally punctiform bearing locations 110 and 111, is exerted by the toothed rack 86 on the gearwheel 66 provided coaxially on the head support 36. This force exerted on the gearwheel 66 also has the effect that the positioning pin 106 is pressed against the positioning block 107, as a result of which the head support 36 is positioned in its operating position. This pressing of the positioning pin 106 against the positioning block 107 has the effect of producing a torque which acts on the head support 36 and by which the support disc 37 is pressed with its bearing surface 38 against the bounding wall 100 of the bearing opening 46, as a result of which the previously mentioned pressing of the bearing part 37 against the cross-sectionally punctiform bearing location 111 is assisted. In this way, in its operating position, the head support 36 is also in this case pressed with its bearing surface 38 exclusively against two predetermined bearing locations 110 and 111 in the bearing opening 46, so that the head support 36 is always brought into always the same operating position in a definitely reproducible way. As a result, the magnetic head 28, supported by the head support 36, always assumes the same scanning position in a definitely reproducible way. In the case of this apparatus as well, in the operating situation represented in FIG. 4, the magnetic tape 3, running over the magnetic head 28 in the tape-running direction 26, exerts on the magnetic head 28 a frictional force which acts on the head support 36 and assists the pressing of the head support 36 against the bearing location 110 and, on account of the inclined path followed by the bounding wall 101, also against the bearing location 111, so that the head support 36 always remains securely in its operating position even if there is a high frictional force acting on the magnetic head 28.

If the head support is rotated into its other operating position, the magnetic head 28 then assuming its scanning position which is turned with respect to the scanning position represented in FIG. 4 and is for scanning the track region 33, the leg spring 81 then loads the toothed rack 86 counter to the direction of the arrow 109 with its leg 81, via the pin 85. As a result, a force which acts in an analogous way to that described above is exerted by the toothed rack 86 on the gearwheel 66. In this case the head support 36 rests with its support disc 37 exclusively against a cross-sectionally punctiform bearing location 112 provided on the bounding wall 99 and again against the cross-sectionally punctiform bearing location 111 provided on the bounding wall 100. As a result, in this case as well, the head support 36 can be brought into always the same operating position in a definitely reproducible way. In this operating position of the head support 36 as well, the frictional force which is exerted by the magnetic tape 3 on the magnetic head 28 and in this case acts in the tape-running direction 27 assists the pressing of the head support 36 against the bearing locations concerned, 112 and 111.

Figure 5:
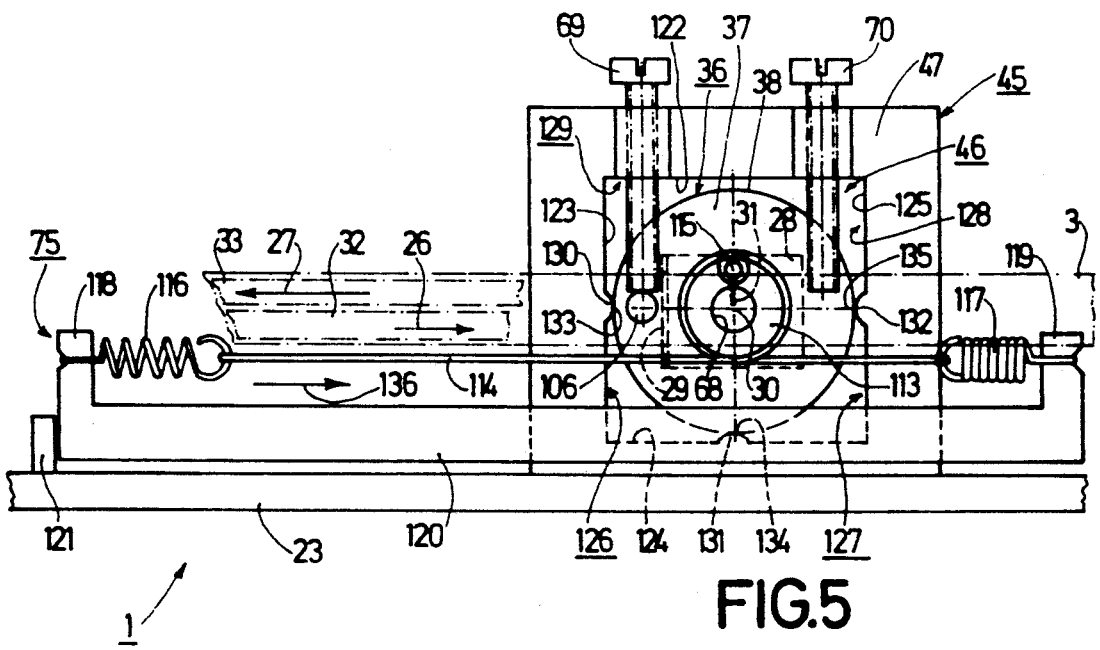
FIG. 5 shows analogously to FIGS. 3 and 4 a detail of a magnetic tape apparatus according to a third exemplary embodiment of the invention.

In the case of the exemplary embodiment diagrammatically represented in FIG. 5, the head support 36 for the magnetic head 28 consists of a cylindrical support disc 37, on which the magnetic head 28 is firmly held by clamping in a recess of the same. The support disc 37 is connected to a coaxial cord cylinder 113 for rotating the head support 36. Wrapped several times around the cord cylinder 113 is a cord 114 of an adjusting device 75, the cord 114 being firmly clamped in its central region to the cord cylinder 113 by a clamping pin 115. The ends of the cord 114 are each connected to one end of a tension spring 116 and 117, respectively. The two tension springs 116 and 117 each form a load-exerting device for loading the head support 36 in its operating positions. The other ends of the tension springs 116 and 117 are each connected to the angled-off end 118 and 119, respectively, of an adjusting slide 120 of the adjusting device 75, which slide is guided adjustably on the support plate 23. The adjusting slide 120 can be displaced back and forth by motor, in a way not shown, between two limiting stops which are provided on the support plate 23 and of which only one limiting stop 121 is shown in FIG. 5.

The bearing device 45 is formed by a block-shaped bearing part 47, which is connected to the support plate 23 and the bearing opening 46 of which is bounded by four bounding walls 122, 123, 124 and 125. Also in the case of this apparatus, the bearing device 45 is provided in the region of the bearing opening 46 with clearances 126, 127, 128 and 129 for the head support 36. In FIG. 5, those elements of the bearing device with which the axial mobility of the head support 36 is limited are not shown for the sake of simplicity. On each of the bounding walls 123, 124 and 125 of the bearing opening 46 there is provided a semi-cylindrical bearing rib 130, 131 and 132, which run in the direction of the turning axis 30 and the crests of which each form a bearing location 133, 134 and 135 for the support disc 37 of the head support 36, between which crests the support disc 37 is rotatably mounted with play. For positioning the head support 36, a positioning pin 106 protrudes from the same and interacts in each operating position of the head support 36 with the free end of a positioning screw 69 and 70, respectively.

In the operating situation represented in FIG. 5, in which the magnetic tape 3 is moved along the magnetic head 28 in the tape-running direction 27, corresponding to the "normal rewind" operating mode, and the head support 36 assumes an operating position corresponding to this operating mode, the adjusting slide 120 of the adjusting device 75 is in contact with the limiting stop 121, the tension spring 116, provided as load-exerting device, then being stressed and the other tension spring 117, provided as load-exerting device, being relieved. A force is exerted by the stressed tension spring 116 via the cord 114 on the cord cylinder 113. This force has the effect that the support disc 37 of the head support 36 is pressed with its bearing surface 38 against the bearing locations 133 and 134 on the bearing ribs 130 and 131 and the positioning pin 106 is pressed against the free end of the positioning screw 69. The pressing of the positioning pin 106 against the free end of the positioning screw 69 has the effect of producing a torque which acts on the head support 36 and by which the pressing of the support disc 37 with its bearing surface 38 against the bearing location 134 on the bearing rib 131 is assisted. In this way, in its operating position, the head support 36 is also in this case pressed with its bearing surface 38 exclusively against two predetermined, cross-sectionally punctiform bearing locations, namely the bearing locations 133 and 134. As a result, it is ensured that the head support 36 is always brought into the same operating position in a definitely reproducible way, so that the magnetic head 28 always assumes the same scanning position. In the case of this apparatus as well, in the operating position represented in FIG. 5, the magnetic tape 3, running over the magnetic head 28 in the tape-running direction 27, exerts on the magnetic head 28 a frictional force which has as a consequence a torque which acts on the head support 36 and assists the pressing of the head support 36 against the bearing location 133 on the bearing rib 130, so that the head support 36 always remains securely in its operating position even if a high frictional force acts on the magnetic head 28.

If the head support 36 is rotated into its other operating position, which takes place by displacing the adjusting slide 120 in the direction of the arrow 136, thereafter the other tension spring 117, provided as load-exerting device, is stressed, but the tension spring 116 is relieved. In this case, a force is then exerted by the stressed tension spring 117 via the cord 114 on the cord cylinder 113. This force has the effect that the support disc 37 is pressed with the bearing surface 38 against the bearing locations 135 and 134 on the bearing ribs 132 and 131 and the positioning pin 106 is pressed against the free end of the positioning screw 70. The pressing of the positioning pin 106 against the free end of the positioning screw 70 has the effect of producing a torque which acts on the head support 36 and by which the pressing of the support disc 37 with its bearing surface 38 against the bearing location 134 on the bearing rib 131 is assisted. In this way, in its operating position, the head support 36 is also in this case pressed exclusively against two predetermined, cross-sectionally punctiform bearing locations, namely the bearing locations 134 and 135. As a result, it is again ensured that the head support 36 is always brought into the same operating position in a definitely reproducible way, so that the magnetic head 28 always assumes the same scanning position. In this operating position of the head support 36 as well, the frictional force which is exerted by the magnetic tape 3 on the magnetic head 28 and in this case acts in the tape-running direction 26 assists the pressing of the head support 36 against the bearing location concerned, 125.

Figure 6:
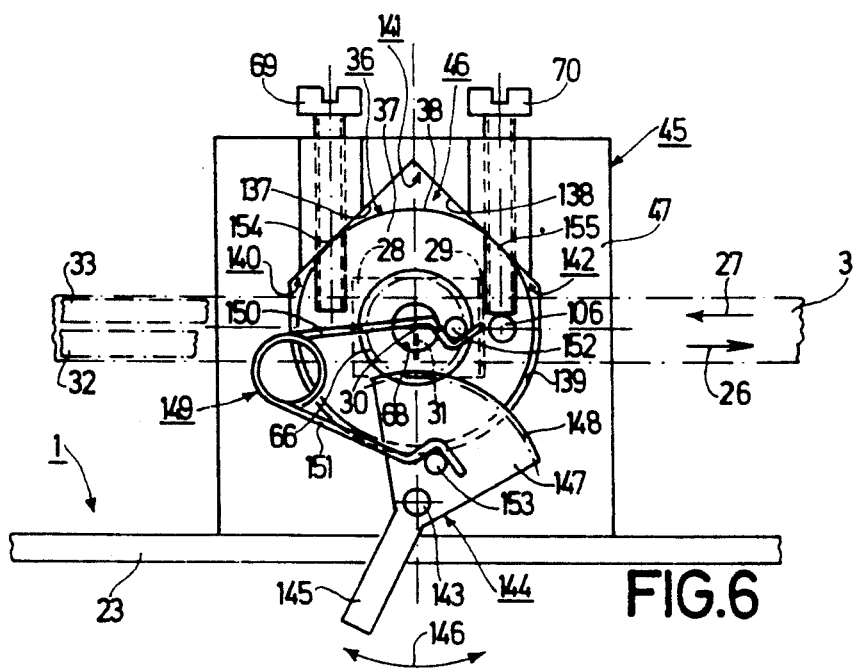
FIG. 6 shows analogously to FIGS. 3, 4 and 5 a detail of a magnetic tape apparatus according to a fourth exemplary embodiment of the invention.

In the case of the exemplary embodiment diagrammatically represented in FIG. 6, the head support 36 for the magnetic head 28 consists of a cylindrical support disc 37, which is connected to a coaxial gearwheel 66 for rotating the head support 36. Here too, the magnetic head 28 is firmly clamped, for example in a recess of the support disc 37. The bearing device 45 is formed by a block-shaped bearing part 47, connected to the support plate 23. In the bearing part 47 there is provided a bearing opening 46, which is bounded by two plane bounding walls 137 and 138 and by an essentially semicircular bounding wall 139. The support disc 37 of the head support 36 is rotatably mounted with play in this bearing opening 46. In FIG. 6, those elements of the bearing device with which the axial mobility of the head support 36 is limited are not shown for the sake of simplicity. Also in the case of this apparatus, the bearing device 45 is provided in the region of the bearing opening 46 with clearances 140, 141 and 142 for the head support 36. For the positioning of the head support 36 in its two operating positions, a positioning pin 106 protrudes from the same and interacts in each operating position of the head support with the free end of a positioning screw 69 and 70, respectively.

In the case of this apparatus, the adjusting device 75 for rotating the head support 36 has an adjusting lever 144, which can pivot on the bearing part 47 of the bearing device 45 about a spindle 143. An arm 145 of the adjusting lever 144 can be pivoted by a drive device (not shown) of the apparatus in the direction of the double-headed arrow 146. After the respective pivoting of the arm 145 by the drive device (not shown), the said drive device is uncoupled from the arm 145 of the adjusting lever 144. The other lever arm 147 is designed in the form of a sector of a circle and has on its free end a toothing 148, which is in engagement with the gearwheel 66 provided coaxially on the head support 36. Pivoting the adjusting lever 144 has the effect via its toothing 148 that the gearwheel 66 can be rotated and in this way the head support 36 can be turned between its two operating positions by rotating about the turning axis 30. As load-exerting device, in this case a leg spring 149 is provided, the two legs 150 and 151 have the tendency to move away from each other and which spring acts in the present case as a dead-centre spring, which is first stressed and then relieved again during turning of the head support 36. The free ends of the two legs 150 and 151 of the leg spring 149 are angled-off in the shape of a V. The one leg 150 acts with its free end on a pin 152, arranged on the gearwheel 66 of the head support 36 eccentrically to the turning axis 30 of the head support 36. The other leg 151 acts with its free end on a further pin 153, protruding from the sector-shaped lever arm 147 of the adjusting lever 144.

In the operating situation represented in FIG. 6, in which the magnetic tape 3 is moved along the magnetic head 28 in the tape-running direction 26, corresponding to the "normal forward running" operating mode, and the head support 36 assumes an operating position corresponding to this operating mode, a force is exerted by the leg spring 149, provided as load-exerting device, via the pin 152 on the head support 36 with the effect that the support disc 37 of the head support 36 is pressed with its bearing surface 38 against two predetermined, cross-sectionally punctiform bearing locations 154 and 155 on the two plane bounding walls 137 and 138 of the bearing opening 46. The force exerted by the leg spring 149 via the pin 152 on the head support 36 also has the effect that the positioning pin 106 is pressed against the free end of the positioning screw 70. The pressing of the positioning pin 106 against the free end of the positioning screw 70 has the effect of producing a torque which acts on the head support 36 and assists the pressing of the support disc 37 of the head support 36 with its bearing surface 38 against the two cross-sectionally punctiform bearing locations 154 and 155. Consequently, also in the case of this apparatus, in its operating position, the head support 36 is pressed with its bearing surface 38 exclusively against two predetermined, cross-sectionally punctiform bearing locations in the bearing opening 46, namely the two bearing locations 154 and 155, so that the head support 36 is brought into always the same operating position in a definitely reproducible way.

If the head support 36 is rotated into its other operating position, which takes place by pivoting of the adjusting lever 144 anticlockwise out of the position represented in FIG. 6, the leg spring 149, provided as load-exerting device, exerts via the pin 152 on the head support 36 a force by which the head support 36 is in this case pressed against the same two bearing locations 154 and 155. This force also has the effect that the positioning pin 106 is pressed against the free end of the positioning screw 69, as a result of which a torque which acts on the head support 36 and by which the pressing of the head support 36 with its bearing surface 38 against these two bearing locations 154 and 155 is assisted is produced in an analogous way. Consequently, in this case as well, the head support 36 is always brought into the same operating position, defined by the two bearing locations 154 and 155, in a definitely reproducible way.

I claim:

1. In a magnetic tape system including a magnetic tape with two track regions, a magnetic head which can be turned through substantially 180° between two scanning positions, each position being assigned to a respective one of said two track regions for scanning each associated track region, said magnetic tape being movable in two tape running directions with respect to said magnetic head to enable said scanning, a rotatable head support supporting the magnetic head, said system including a bearing device with a bearing opening, said head support being loosely mounted in said bearing device, an adjusting device for said head support which can rotate said head support between two operating positions whereby said magnetic head is turned between its two scanning positions, said system also including positioning devices for positioning said head support in its two operating positions, a load exerting device for exerting a pressing force to a bearing surface of said head support in both operating positions of the head support, said load exerting device also pressing said positioning devices together, said bearing device including clearances in the bearing opening for said head support, said bearing surface of said head support being pressed against respective bearing locations in the bearing opening for each of the operating positions of the head support, said bearing locations and said bearing surface making point-like contact when pressed against each other, said bearing opening being formed with straight bounding walls, and said predetermined bearing locations being located on said straight bounding walls, wherein the improvement comprises:

that in each of the operating positions of the head support a frictional force exerted by the magnetic tape moving over the magnetic head adds to the pressing force exerted by the load exerting device on the head support in pressing it against a respective one of said bearing locations.

2. Apparatus according to claim 1, characterized in that the bearing opening has two bounding walls running perpendicularly to the two tape-running directions and one bounding wall running parallel to the two tape-running directions, on which three bounding walls the bearing locations are provided.

* * * * *